US007260099B1

(12) United States Patent
Brown et al.

(10) Patent No.: US 7,260,099 B1
(45) Date of Patent: Aug. 21, 2007

(54) PROCESSING OF ARBITRARILY FORMATTED CLIENT SIGNALS TO ACHIEVE COMPATIBILITY WITH EXISTING TRANSPORT NETWORKS

(75) Inventors: Matthew D. Brown, Kinburn (CA); Peter T. H. Kwa, Kanata (CA); Peter J. Anslow, Bishops Stortford (GB)

(73) Assignee: Nortel Networks Limited, St. Laurent (CA)

( * ) Notice: Subject to any disclaimer, the term of this patent is extended or adjusted under 35 U.S.C. 154(b) by 1047 days.

(21) Appl. No.: 09/616,997

(22) Filed: Jul. 14, 2000

(51) Int. Cl.
*H04L 12/28* (2006.01)

(52) U.S. Cl. ................ 370/395.51; 370/466; 370/476; 370/907

(58) Field of Classification Search ................ 370/389, 370/394, 395.5, 395.6, 474, 476, 503, 504, 370/505, 506, 509–512, 907
See application file for complete search history.

(56) References Cited

U.S. PATENT DOCUMENTS

| | | | | |
|---|---|---|---|---|
| 5,065,396 A | * | 11/1991 | Castellano et al. | ......... 370/536 |
| 5,461,622 A | * | 10/1995 | Bleickardt et al. | .......... 370/470 |
| 6,496,519 B1 | * | 12/2002 | Russell et al. | .............. 370/465 |
| 6,522,671 B1 | * | 2/2003 | Solheim et al. | ............. 370/535 |
| 6,584,118 B1 | * | 6/2003 | Russell et al. | .............. 370/466 |
| 6,594,279 B1 | * | 7/2003 | Nguyen et al. | ............. 370/468 |
| 6,842,455 B1 | * | 1/2005 | Heuer | ........................ 370/393 |

OTHER PUBLICATIONS

Leung, Implementing Packet Transfer over SONET/SDH, PMC-Sierra, Inc., pp. 119-122, 1999.*
Manchester et al, IP over SONET, IEEE, pp. 136-142, May 1998.*

* cited by examiner

*Primary Examiner*—Frank Duong
(74) *Attorney, Agent, or Firm*—Withrow & Terranova, PLLC

(57) ABSTRACT

A client signal received at an ingress interface is adapted to a higher-rate transport signal. Clock frequency acceleration is achieved by an M/N-multiplying PLL where the magnitude of M and N can be restricted without causing the rate of the resulting transport signal rate to deviate unacceptably from a nominal transport signal rate. Each frame of the transport signal has a payload section with a fixed number of transport payload bytes, each of which is either a dummy byte or a client byte. The number of client bytes per transport frame is within one byte of the number of client bytes actually received at the ingress interface during the duration of the frame. The designation of each frame as a low-fill frame or a high-fill frame is automatically regulated by checking the fill level of a memory element and is redundantly encoded by the ingress interface and transmitted to an egress interface as part of the frame.

38 Claims, 12 Drawing Sheets

| CLIENT SIGNAL | CLIENT SIGNAL RATE (Mbps) | N | M | RESULTING TRANSPORT SIGNAL CLOCK RATE (Gbps) | QUANTIZATION ERROR RELATIVE TO $R_{NOM}$ |
|---|---|---|---|---|---|
| E3 | 34.3680 | 5 | 388 | 2.66696 | +337 ppm |
| FAST ETHERNET | 125.0000 | 3 | 64 | 2.66667 | +229 ppm |
| E4 | 139.2640 | 7 | 134 | 2.66591 | -55 ppm |
| STM-1/OC-3 | 155.5200 | 7 | 120 | 2.66606 | 0 ppm |
| AYNCHRONOUS FOTS 565M | 564.9920 | 39 | 184 | 2.66560 | -170 ppm |
| STM-4 / OC-12 | 622.0800 | 7 | 30 | 2.66606 | 0 ppm |
| GIGABIT ETHERNET | 1250.0000 | 15 | 32 | 2.66667 | +229 ppm |
| STM-16 / OC-48 | 2488.3200 | 14 | 15 | 2.66606 | 0 ppm |

FIG. 8

PROCESSING OF ARBITRARILY FORMATTED CLIENT SIGNALS TO ACHIEVE COMPATIBILITY WITH EXISTING TRANSPORT NETWORKS

FIELD OF THE INVENTION

The present invention generally relates to the communication of digital signals within a transport network. More particularly, the present invention pertains to the conversion of client signals into transport signals having a format suitable for use in an existing transport network and also to the conversion of such transport signals back into client signals having the original client signal format.

BACKGROUND OF THE INVENTION

High-capacity transport networks such as optical transport networks (OTNs) have heretofore been successfully used for providing end-to-end connectivity between customer sites adapted to transmit and receive certain types of client signals. In a typical scenario, shown in FIG. 1, a customer site 105 transmits a client signal having a certain client signal format to an ingress interface 100 such as a hub or central office (CO). The ingress interface 100 is connected to the OTN 110 by a high-capacity link 120 such as an optical fiber. The client signal received by the ingress interface 100 is intended to be transmitted to another customer site 125 connected to the OTN 110 via an egress interface 130 (such as another hub or central office) and a corresponding high-capacity link 140.

The ingress interface 100 typically encapsulates the client signal within a transport signal that adheres to a format known as a transport signal format. In most existing OTNs, the transport signal format and the client signal format are not independent. Rather, when setting up the OTN to service a group of large or medium-sized customers, the transport signal format is carefully chosen to simplify encapsulation of client signals having a client signal format commonly used by those customers. An example of a popular client signal format is the SONET OC-48 client signal format which refers to a frame-based Synchronous Optical NETwork Optical Carrier signal having a bit rate of 48 times the basic OC-1 rate of 51.84 Mbps.

By way of example, a transport signal format which was specifically designed to simplify the encapsulation of client signals in the OC-48 format is the so-called G.975 format as defined in ITU Recommendation G.975 "Series G: Transmission Systems and Media; Digital System and Networks; Digital Transmission Systems—Digital Sections and Digital Line System—Optical Fibre Submarine Cable Systems; Forward Error Correction for Submarine Systems" and incorporated by reference herein in its entirety.

There exist other transport signal formats which provide simplified encapsulation of client signals having a limited number of other client signal formats used by large and medium-sized "legacy" customers. As a result, most OTNs in use today are able to accommodate transport signals having a transport signal format that facilitates the encapsulation of client signals adhering to one or another of a limited number of client signal formats.

However, as the thirst for seamless end user connectivity grows, so does the diversity of customers desirous of reaping the benefits of a high-capacity OTN. Thus, a new generation of customer has appeared alongside the more traditional large and medium-sized legacy customer. Many of these newer customers utilize equipment which produces client signals in a format which is not easily encapsulated by the transport signal formats currently used in most existing OTNs. As a result of the incompatibility existing between today's OTNs and many of the "nontraditional" client signal formats employed by an emerging customer base, end-to-end connectivity and its myriad potential benefits are seldom realized.

A possible solution would be to change the transport signal format used within an existing OTN in order to accommodate encapsulation of client signals having new, nontraditional formats. However, a large investment in OTN infrastructure depends on the chosen transport signal format and thus any change to the transport signal format would lead to a prohibitively expensive overhaul of many backbone networks in use today. Moreover, the legacy customers around which existing OTNs were built have not disappeared from the scene. This raises a complexity issue since access to existing OTNs must not only be provided to a new breed of customer but such access must continue to be provided to customers who employ the more traditional client signal formats.

SUMMARY OF THE INVENTION

Clearly, it would be an advantage to provide adaptation of client signals adhering to nontraditional client signal formats in such a way that these may be transported across an OTN which has been designed around an established transport signal format such as the G.975 format.

It would also be advantageous to ensure that a client signal which is adapted for transport through an OTN can be recovered at an egress interface without a significant increase in deviation from its original rate. Thus, it would be beneficial if the egress interface were capable of outputting the extracted client bytes at a substantially even rate.

To this end, the present invention pads client bytes with "dummy" bytes at the ingress interface. Using an insertion algorithm, the client bytes and dummy bytes are inserted into byte positions of the payload section of successive transport frames. The number of client bytes in the payload section of a particular frame is within one byte of the number of client bytes received at the ingress interface during the duration of the frame.

The precise number of client bytes in the payload section of a particular frame is encoded within an ancillary data section of the frame. The bytes in each frame are transmitted over the OTN at a transport rate which is higher than the rate of the received client bytes. It is within the scope of the invention to decide how many client bytes to insert into the payload section of a frame by storing the received client bytes in a buffer before they are inserted and monitoring the fill level of this buffer. If the fill level is below a threshold, the payload section will contain a lesser number of client bytes, while if the fill level is above the threshold, the payload section will contain a greater number of client bytes.

At the egress interface, an extraction algorithm is used to extract the client bytes from the payload section of successive received frames. The extraction algorithm closely parallels the insertion algorithm. The number of client bytes in the payload section of each frame is determined from the ancillary data section of that frame. The extraction algorithm therefore knows the location of each client byte within the payload section of each frame.

Advantageously, the invention provides compatibility between arbitrary client signal formats and an established transport signal format, allowing network operators to capitalize on emerging market opportunities. Moreover, the compatibility afforded by the present invention promotes the preservation of OTN infrastructure, which protects the investment already made in existing OTNs.

Further advantages can be gained by implementing specific embodiments of the invention, some of which permit a substantially even distribution of client bytes within the transport frames, others of which allow reduced complexity when implementing clock rate translation circuits.

Thus, according to a first broad aspect, the invention may be summarized as a method of converting a received client signal containing client data units into a frame-based transport signal at a higher bit rate. The method includes the steps of (1) creating successive payload sections each accommodating the same number of transport data units, each transport data unit being set either to a received client data unit or to a dummy data unit and (2) creating successive frames of the transport signal by appending ancillary data to each payload section. The number of client data units carried by the payload section of each frame is within one client data unit of the actual number of client data units received during the duration of that frame.

The number of client data units received during the duration of a frame may be a whole number or a fractional number falling between two adjacent integers $F_L$ and $F_H$. If it is a whole number, the number of client data units carried by the payload section of each frame is exactly equal to the whole number, while if is a fractional number, the number of client data units carried by the payload section of each frame is equal to either $F_L$ or $F_H$. The ancillary data associated with the frame could contain information related to the chosen number of client data units carried by the payload section in that frame.

The method may include the further step of temporarily storing the received client data units in a buffer having a measurable fill level, wherein the number of client data units carried by the payload section of each frame is a function of the fill level of the buffer.

The first transport data unit in the payload section of each frame may always be set to a client data unit, in which case the method may include the further step of incrementing a counter each time a transport data unit is set either to a client data unit or to a dummy data unit, by an amount equal to the number of client data units carried by the payload section of the current frame, wherein the counter has a modulus equal to the total number of transport data units accommodated by the payload section of each frame. Each transport data unit other than the first one in the payload section of the current frame would thus be set either to a client data unit or to a dummy data unit as a function of the overflow status of the counter after performing the incrementing step for that transport data unit.

The invention may be summarized according to another broad aspect as a system for converting a received client signal containing client data units into a frame-based transport signal. The system includes a first processing module adapted to output transport data units, each of which is set either to one of the received client data units or to a dummy data unit. The first processing module is further adapted to ensure that the number of client data units output during each frame is within one client data unit of the number of client data units received during the duration of that frame.

The system also includes a second processing module connected to the first processing module and adapted to create successive payload sections each accommodating the same number of transport data units received from the first processing module. The second processing module is further adapted to create successive frames of the transport signal by appending an ancillary data section to each payload section and outputting the data units in the ancillary section and the payload section faster than the rate at which the client signal is received.

The invention may be summarized according to another broad aspect as a method of converting a received transport signal into a client signal, including the steps of determining whether each transport data unit in each frame is a client data unit or a dummy data unit and outputting to a buffer only those transport data units determined to be client data units. The client signal may be created by reading from the buffer at a rate lower than that of the transport signal.

The invention may be summarized according to another broad aspect as a system for converting a transport signal into a client signal, the system having a first and second processing modules. The first processing module is adapted to locate the payload section of each received frame and to output the transport data units in the payload section of each frame. The second processing module is adapted to determine whether each transport data unit is a client data unit or a dummy data unit and to output to only those transport data units found to be client data units.

The invention may be summarized according to another broad aspect as a method for converting a client signal containing client data units into a frame-based transport signal compatible with a transport network and for retrieving the client signal at another part of the network. The method includes the steps of:

at an ingress interface, creating successive payload sections each accommodating the same number of transport data units, each transport data unit being set either to a received client data unit or to a dummy data unit; creating successive frames of the transport signal by appending ancillary data to each payload section, wherein the number of client data units carried by the payload section of each frame is within one client data unit of the actual number of client data units received during the duration of that frame; and sending the frames into the transport network towards an egress interface at a data unit rate higher than that of the client signal; and at the egress interface, determining whether each transport data unit in each frame is a client data unit or a dummy data unit; outputting to a buffer only those transport data units determined to be client data units; and reading from the buffer at the lower data unit rate, thereby to recover the original client signal.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings, in which:

FIG. 8 is a table showing various client signal formats and the quantization error resulting from using small rational numbers as clock frequency multiplication factors;

DETAILED DESCRIPTION OF THE PREFERRED EMBODIMENTS

The features of the invention can be more fully appreciated following a brief description of the G.975 transport signal format. However, although the description of specific embodiments herein below will rely on the G.975 transport signal format as an example, those skilled in the art should appreciate that the present invention is applicable generally to any type of transport signal format including alternatives such as the so-called G.709 format.

Figure 1:
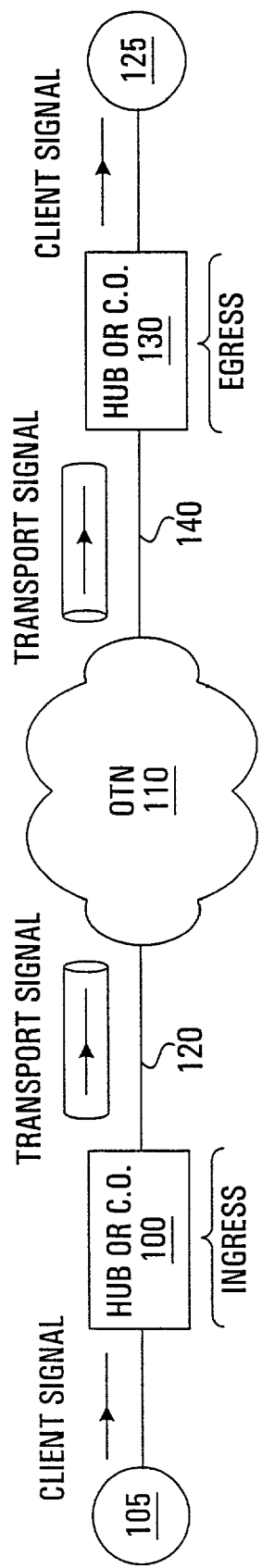
FIG. 1, already described, shows an end-to-end link between two customer sites through ingress and egress interfaces and an intervening optical transport network.
Figure 2:
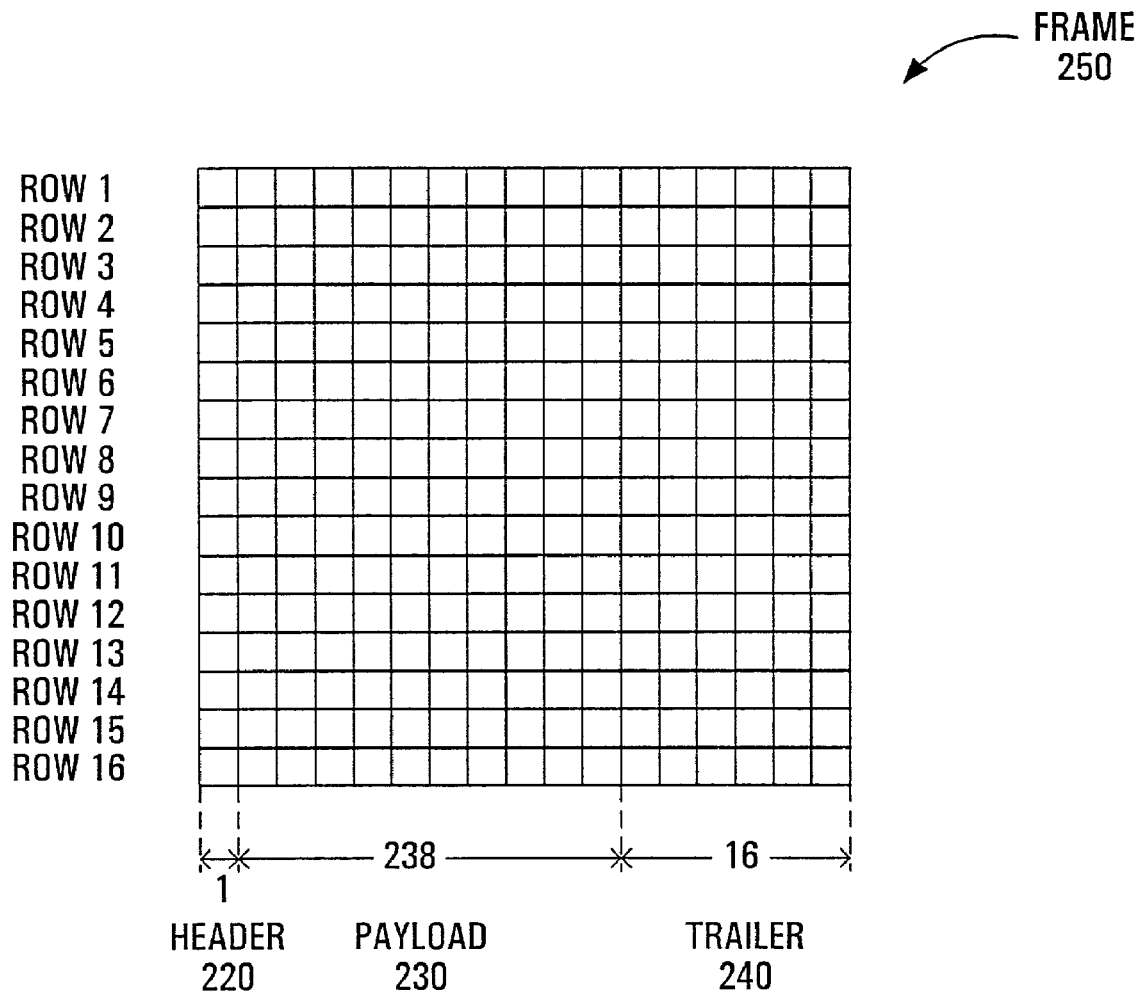
FIG. 2 illustrates a frame according to the G.975 standard.

With reference to FIG. 2, a transport signal adhering to the G.975 format is a digital signal which can be viewed as a sequence of bytes, each of which corresponds to a respective element of a two-dimensional byte array commonly referred to as a "transport frame" 250. In the G.975 standard, the transport frame 250 has 255 columns of 16 rows of bytes: the $1^{st}$ column is known as the header section 220 and carries header information, the $2^{nd}$ through the $239^{th}$ columns are known as the payload section 230 and carry payload information, and the $240^{th}$ through the $255^{th}$ columns are known as the trailer section 240 and carry trailer information.

Each transport frame is typically transmitted in a column-by-column fashion; viewed differently, the rows are byte-interleaved. Thus, within a transport frame of 255×16 bytes, the 16 bytes in the header section appear before the 3808 bytes in the payload section, which are followed by the 256 bytes in the trailer section. Of course, other transport frame structures are possible, as are other modes of transmission such as row-by-row.

As has already been mentioned, the transport signal formats which are employed within existing transport networks have usually been carefully designed for compatibility with legacy-type client signal formats. This is also true of the G.975 format, which was designed to encapsulate SONET OC-48 signals within the payload section of successive transport frames. Compatibility is provided by transmitting all bytes in a G.975 transport frame in the same amount of time as it would take to transmit 3808 bytes at the OC-48 rate of 2.48832 Gbps (approximately 12.24 microseconds).

Since each G.975 transport frame not only includes a payload section but also includes a header section and a trailer section, it is the entire G.975 transport frame of 4080 bytes which is transmitted in those 12.24 microseconds. It follows that the bit rate of a transport signal having the G.975 format is equal to 255/238 (=15/14) times the OC-48 bit rate of 2.48832 Gbps, which is approximately equal to 2.6660571 Gbps.

It should therefore be apparent that in order to create a G.975 transport signal from an OC-48 client signal, one simply (1) extracts the client clock signal, (2) increases the frequency of the client clock signal by a factor of 15/14, (3) creates successive payload sections with successive sets of 3808 client bytes, (4) creates successive transport frames by appending a 16-byte header section and a 256-byte trailer section to each payload section and (5) transmits the bytes in each transport frame at the higher bit rate and in the appropriate order (i.e., on a column-by-column basis).

Figure 3:
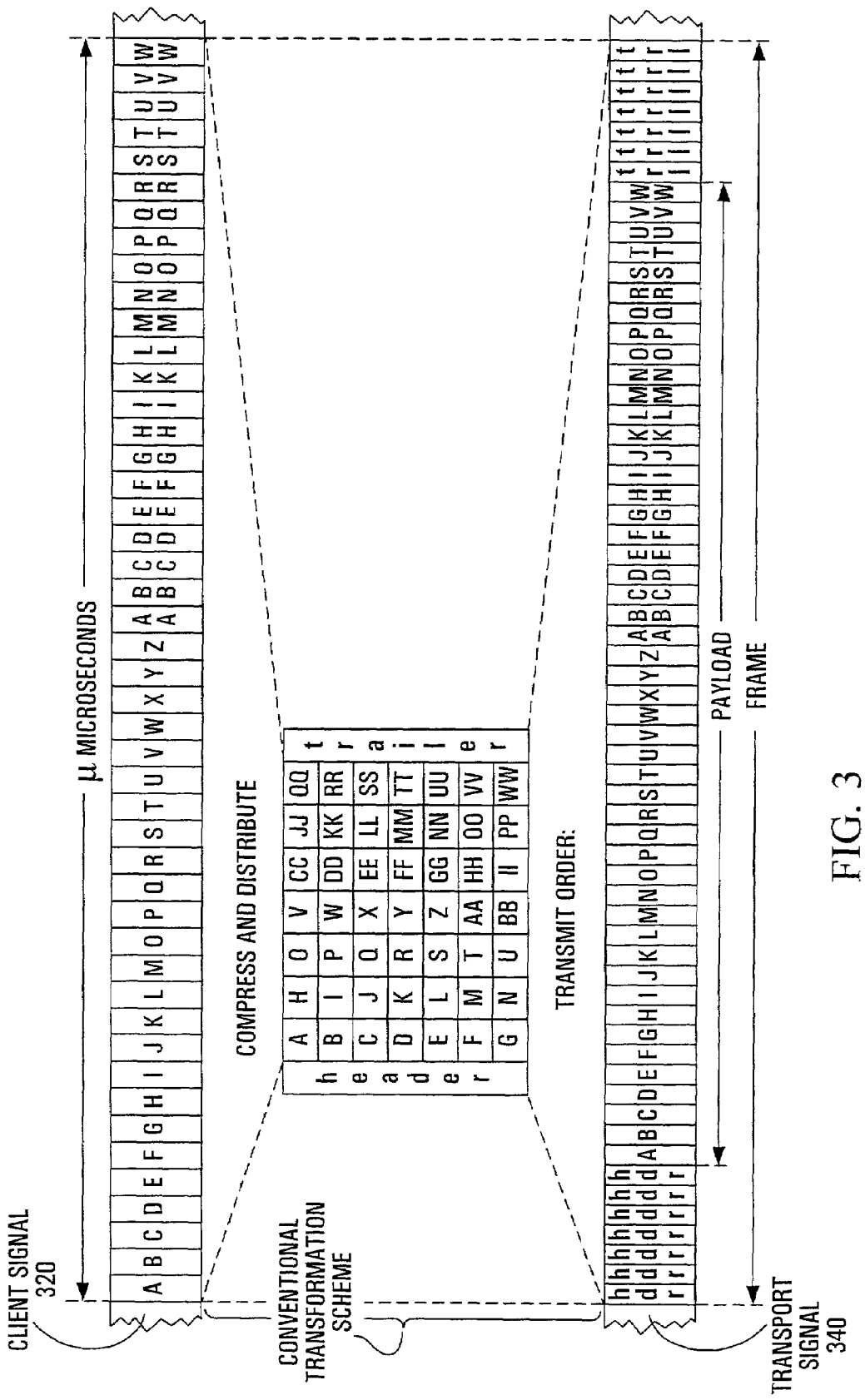
FIG. 3 depicts the bytes of a client signal and those of a transport signal against an increasing time reference.

The harmonious match between client signal format and transport signal format, such as is the case with SONET OC-48 and G.975, is conceptually illustrated in FIG. 3, where exactly 49 client bytes (shown as A through WW) of a client signal 320 are received within a duration of μ microseconds and fit squarely into the 49 bytes in the payload section of a transport frame transmitted in those same μ microseconds. Thus, there is seen to be a one-to-one correspondence between the bytes of the OC-48 client signal and the bytes in the payload sections of successive G.975 transport frames. The 49 bytes in the transport frame are extracted on a column-by-column basis and are subsequently transmitted across the transport network in the form of a transport signal 340 at a higher rate than the client signal.

Those skilled in the art should appreciate that the relationship between client signal and transport signal as depicted in FIG. 3 serves merely as a specific example to illustrate the case where the number of client signal bytes received during the duration of a transport frame is a whole number. This in turn serves to illustrate that in such cases, it is generally a simple matter to transform the client signal into the transport signal.

Unfortunately, a simple transformation scheme from client signal to transport signal is not applicable when the number of client bytes received within the fixed duration of a transport frame is less than the number of bytes in the payload section of a transport frame. In other words, a client signal adaptation scheme is required when the payload section of a transport frame cannot be completely filled with the number of client bytes received in μ microseconds. A problem becomes how to distribute the received client bytes within the payload section of successive transport frames.

Figure 4A:
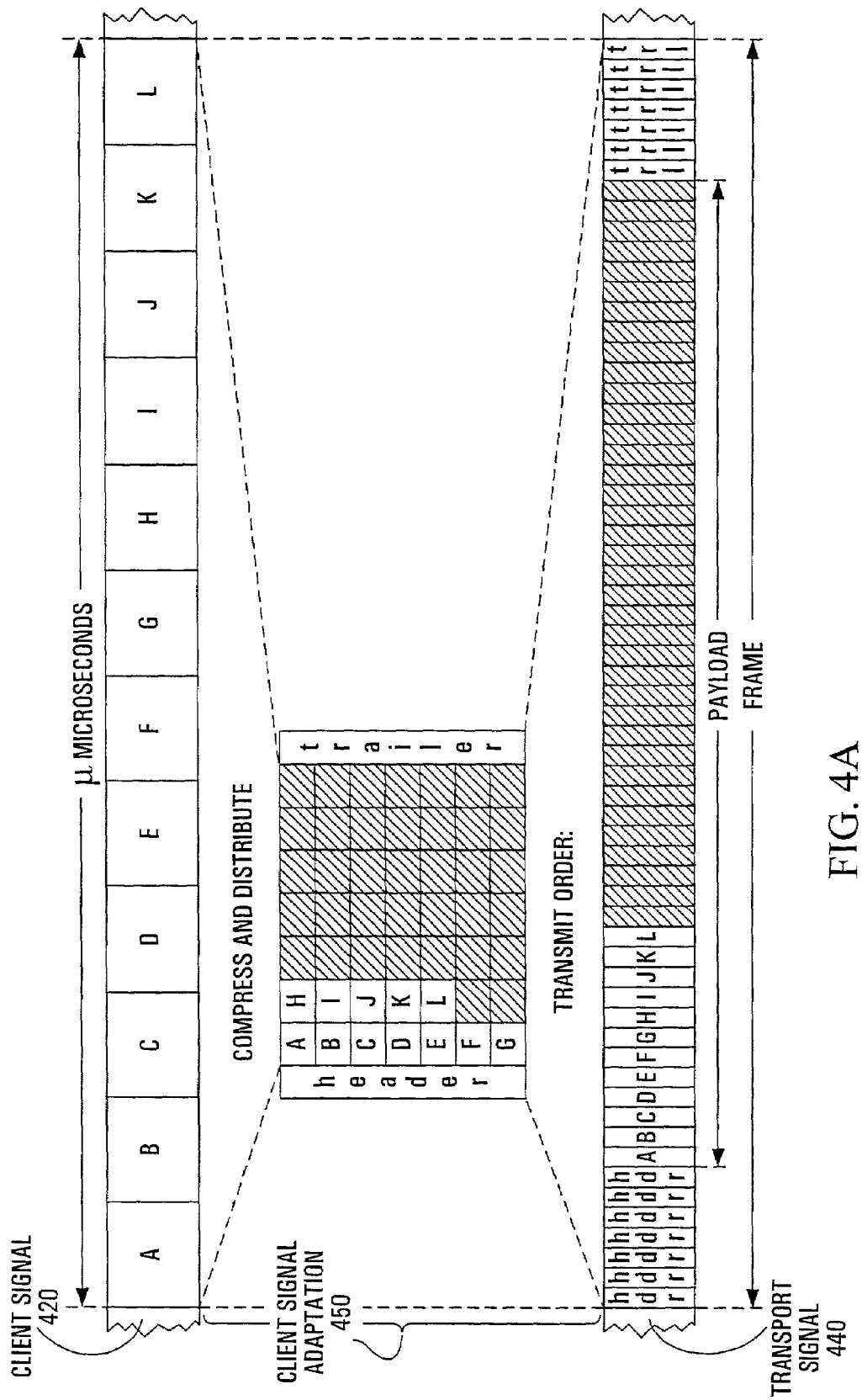
FIGS. 4A–4C show the effects of a client signal adaptation scheme in accordance with specific embodiments of the present invention.
Figure 4B:
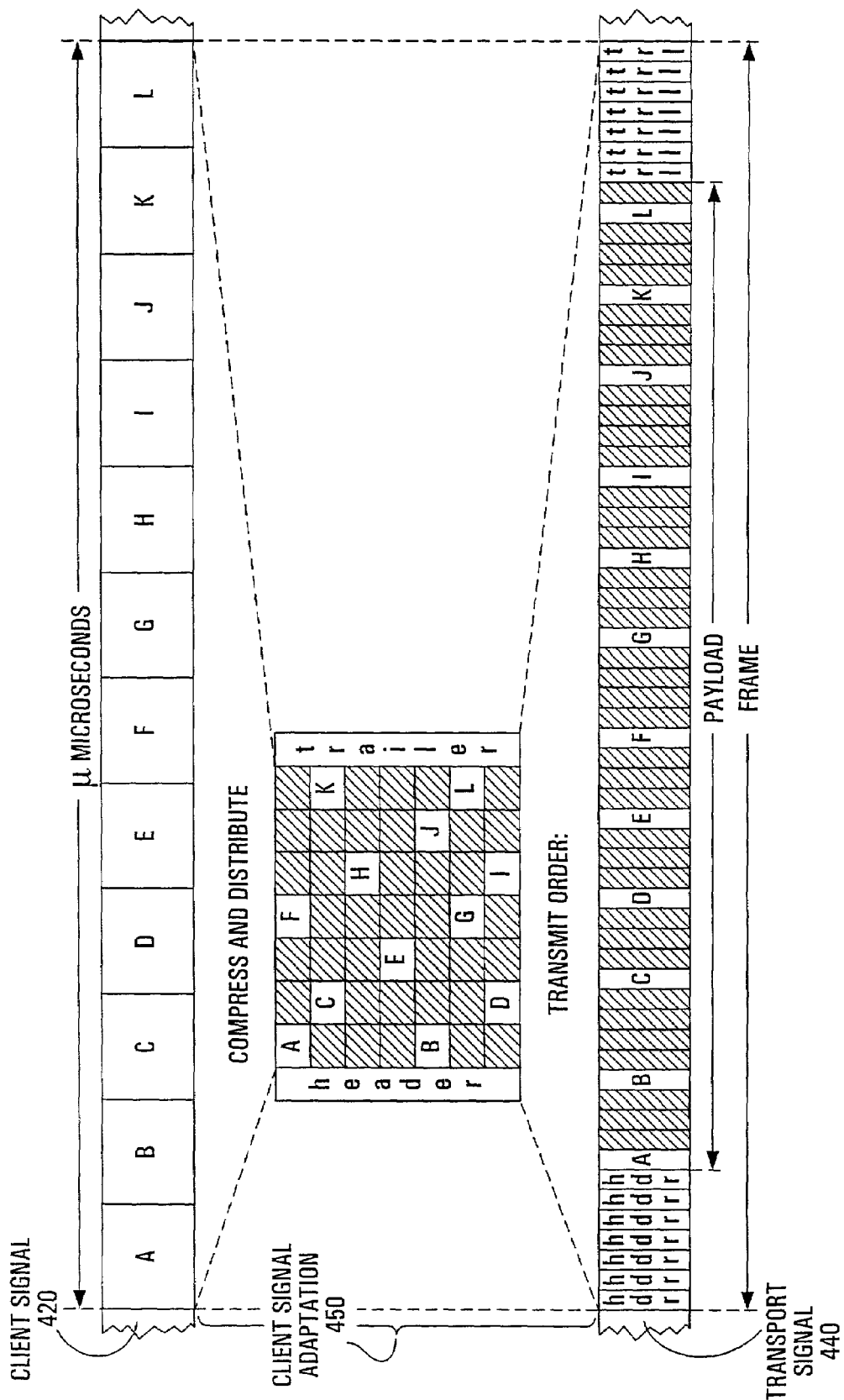
Figure 4C:
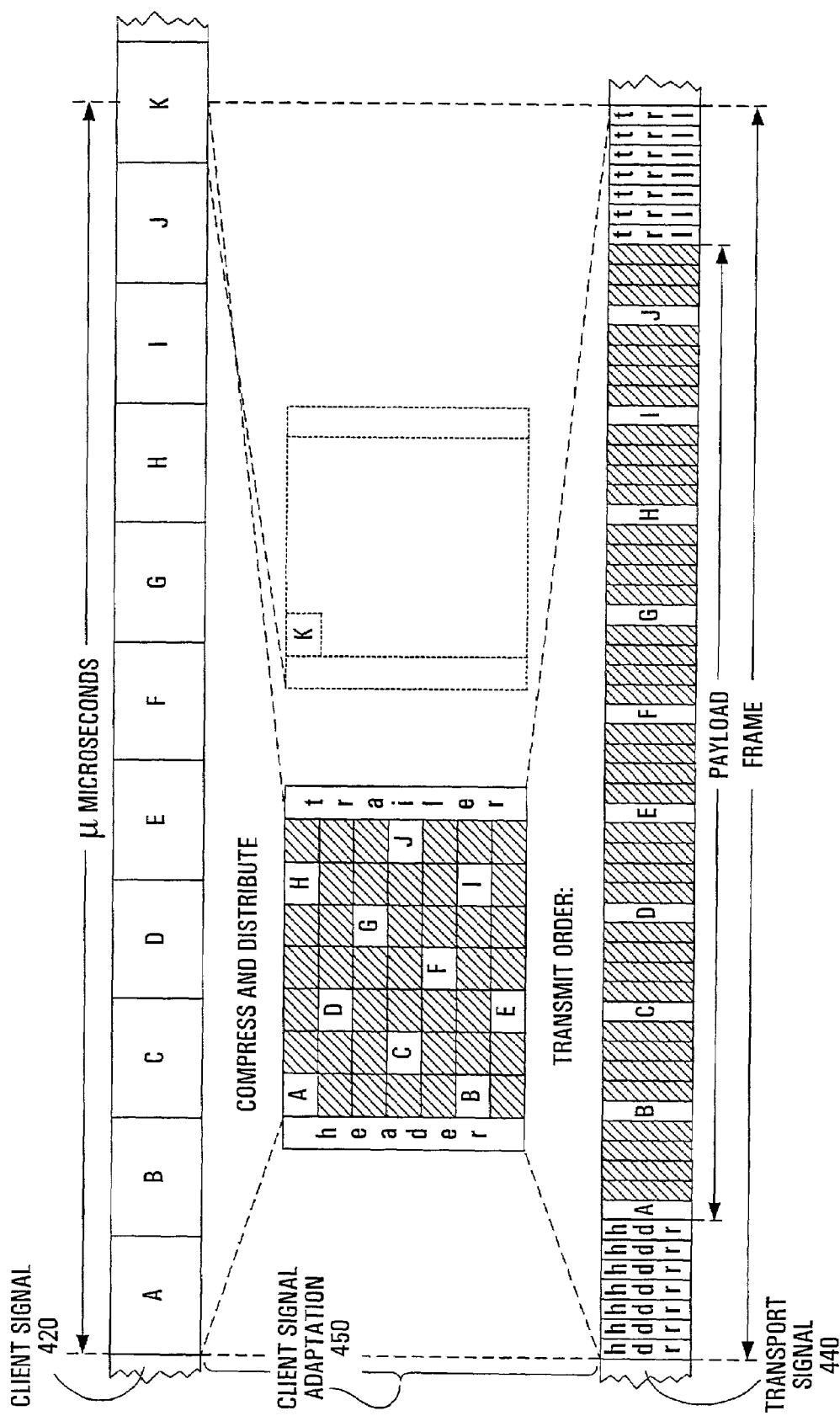

The present invention offers a solution to this problem as illustrated in FIGS. 4A, 4B and 4C, which show different embodiments of a client signal adaptation scheme 450. The client signal adaptation scheme is performed at the ingress interface on the bytes of an arbitrary client signal 420, resulting in a hypothetical transport signal 440 having a pre-defined format. For ease of illustration, the hypothetical transport signal 440 has the same format as in FIG. 3 and therefore consists of transport frames with a 7-byte header section, a 49-byte payload section and a 7-byte trailer section. Of course, the format of the transport signal could be the G.975 format or any other known or as yet undefined format which is employed by an OTN.

FIG. 4A illustrates an embodiment of the invention which solves the problem occurring in conventional transformation schemes when the total number of client bytes received at the ingress interface during a transport frame is less than the number of bytes in the payload section (in this case 49). Specifically, an embodiment of the client signal adaptation scheme 450 of the present invention supplements (i.e., "pads") the total number of client bytes received during a frame interval by so-called "dummy" bytes as the bytes are inserted into the payload section of a transport frame. Such insertion could be performed on a column-by-column basis (as shown) or on a row-by-row basis, for example. In FIG. 4A, it is seen that client bytes A through L almost completely fill the first two columns in the payload section while the remainder of the payload section is filled with dummy bytes whose value is unimportant.

In some applications, it may be of significance not only to pad the client bytes with dummy bytes within a transport frame, but also to maintain a relatively even distribution of the client bytes and dummy bytes within the payload section of the transport frame. The chosen distribution may have a bearing on factors such as latency and rate variance at the egress interface.

For instance, if the client signal adaptation scheme of FIG. 4A is used, the ingress interface needs to wait until it has received client byte "G" before it can transmit the first column in the payload section and it must then wait until it has received the last client byte "L" before it can transmit the second column in the payload section (along with two dummy bytes). The other five columns in the payload section of the transport frame consist entirely of dummy bytes that will be transmitted while the client bytes destined to be part of the next frame are being received. This introduces a delay before which a transport frame can leave the ingress interface in its entirety. By distributing the client bytes evenly throughout the frame, storage requirements and associated delay may be reduced.

Accordingly, FIG. 4B shows a client signal adaptation scheme which provides a substantially even distribution of client bytes within the payload section of a hypothetical transport frame. It is seen that client bytes "A" and "B" are separated by three dummy bytes, as are client bytes "B" and "C". However, client bytes "C" and "D" are separated by four dummy bytes. The pattern of "3-3-4" continues until the very last client byte "L" is inserted into the second-last position within the last column in the payload section of the transport frame. The exact details of how to decide whether to insert a client byte or a dummy byte for each byte in the payload section will be described further below with reference to FIG. 5.

Next, FIG. 4C illustrates the situation where the number of client bytes received at the ingress interface during μ microseconds is not a whole number. Specifically, client byte "K" has not been received in its entirety after the expiry of μ microseconds. In such cases, the received number of client bytes will fall between two adjacent integers (denoted "$F_L$" and "$F_H$"), the lesser of which is $F_L$ and is computed as:

$$F_L = \text{int}(N_C)$$

$$= \text{int}(N_P * R_C / R_P)$$

$$= \text{int}(N_P * R_C * (N_P / T_F))$$

$$= \text{int}(R_C * T_F)$$

where $N_C$=Number of client bytes which fit into a transport frame $N_P$=Number of transport payload bytes which fit into a transport frame $R_C$=Number of client bytes received at the ingress interface in each second $R_P$=Number of transport payload bytes released by the Ingress interface in each second int (*)=largest integer less than or equal to *.

Thus, when the number of received client bytes is not a whole number but is between $F_L$ and $F_H$, it is necessary to deal with the fact that not all transport frames can contain the same, constant number of client bytes. In other words, while it is unacceptable to transmit $F_L$ client bytes in all transport frames because excess client bytes will accumulate endlessly at the ingress interface, it is likewise unacceptable to transmit $F_H$ client bytes in all transport frames because the ingress interface will eventually run out of client bytes.

To cope with this situation, not only does the client signal adaptation scheme require padding (as in FIGS. 4A and 4C) but such scheme should arrange for the ingress interface to transmit $F_L$ client bytes in some transport frames (known as "low-fill" frames) while transmitting $F_H$ client bytes in other transport frames (known as "high-fill" frames). Moreover, for proper operation at the egress interface, the egress interface must be informed as to whether each transport frame received across the OTN is a low-fill frame or a high-fill frame.

In summary, therefore, it is essential for the client adaptation scheme to provide some sort of padding and, furthermore, it is desirable that such padding result in an even distribution of client bytes within the payload section of a transport frame. Moreover, if the number of client bytes received during the time span associated with a transport frame is not a whole number, the number of client bytes carried by a given transport frame should fluctuate and the egress interface should be enabled to track this fluctuation.

Accordingly, an embodiment of a system which implements a client signal adaptation scheme having the above features is now described with reference to FIG. 5. The system could be located in an ingress interface and comprises a clock recovery circuit 510, a clock frequency multiplication circuit 520, a clock processing module 530, a readable/writable memory element 540, a client byte processing module 550 and a frame construct module 560.

An incoming client signal is fed both to the clock recovery circuit 510 and to the memory element 540. The memory element 540 can be a first-in first-out (FIFO) buffer with a data input port 540$_{IN}$ and a data output port 540$_{OUT}$. The memory element 540 is also equipped with the ability to signal its fill level to the client byte processing module 550 via a control line 545. The fill level could be pushed on a periodic basis or it could be supplied to the client byte processing module 550 on demand.

The memory element 540 can be written to bit-wise and read from byte-wise. A write enable port 540$_{WE}$ is provided for synchronizing the writing of bits from the data input port 540$_{IN}$ into the memory element 540. A read enable port 540$_{RE}$ is provided for synchronizing the reading of bytes from the memory element 540 to the data output port 540$_{OUT}$. The read enable port 540$_{RE}$ and the data output port 540$_{OUT}$ are both connected to the client byte processing module 550.

The clock recovery circuit 510 comprises suitable circuitry, such as a phase-locked loop (PLL), for extracting a client clock signal $CLK_C$ from the client signal. The client clock signal $CLK_C$ is fed to the write enable port 540$_{WE}$ of the memory element 540. Thus, the memory element 540 is written to bit-wise in synchronism with cycles in the client clock signal $CLK_C$. The client clock signal $CLK_C$ is also fed to the clock frequency multiplication circuit 520.

The clock frequency multiplication circuit 520 comprises circuitry for generating a transport clock signal $CLK_T$ at a rate which is a rational number multiple M/N times the rate of the client clock signal $CLK_C$. Thus, the output of the clock frequency multiplication circuit 520 consists of an accelerated clock signal (denoted $CLK_T$) as well as a set of parameters M and N which define the rational number multiple M/N. The accelerated rate can be referred to as the "nominal OTN rate". For notational convenience and generality, the nominal OTN rate will hereinafter be denoted by the generic variable "$R_{NOM}$".

Figure 7:
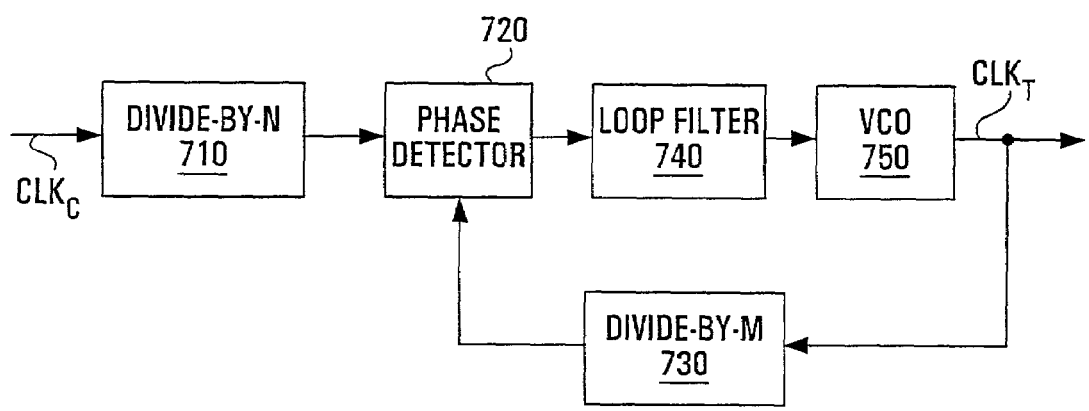
FIG. 7 is a block diagram of an M/N-multiplying phase-locked-loop which may be used as a clock frequency multiplication circuit in the embodiment of FIG. 5.

The clock frequency multiplication circuit 520 may be embodied as an M/N-multiplying PLL now described in more detail with reference to FIG. 7. The M/N-multiplying PLL consists of a divide-by-N counter 710 connected to a first input of a phase detector 720. A second input of the phase detector 720 is connected to a divide-by-M counter 730. An output of the phase detector 720 is connected to a loop filter 740 which is in turn connected to a voltage-controlled oscillator (VCO) 750. The output of the VCO 750 is connected to an input of the divide-by-M counter 730.

Operationally, the phase detector 720 and the loop filter 740 produce a control signal for driving the VCO 750, such that both inputs to the phase detector 720 are of equal frequency and phase. Since the only available degree of freedom is with respect to the signal being fed to the phase detector 720 via the feedback loop, the circuit will auto-adjust the output of the divide-by-M counter 730 until it is equal in frequency and phase to the output of the divide-by-N counter 710.

Thus, upon convergence, the output of the VCO 750 will be a signal whose frequency, when divided by M, is equal to the frequency of the client clock signal $CLK_C$ divided by N. The output of the VCO 750 therefore consists of the transport clock signal $CLK_T$ running at a rate equal to M/N times the rate of the client clock signal $CLK_C$. Furthermore, the phase difference between the two clock signals $CLK_C$, $CLK_T$ is locked.

It is usually possible to find two moderate size integers for expressing the rational number multiple M/N which defines the ratio of the transport clock rate to the client clock rate. For instance, in the case of an OC-48 client signal and a G.975 transport signal, M equals 15 and N equals 14. However, for other, arbitrary combinations of client signal format and transport signal format, M and N may have to be quite large. Nonetheless, it can be shown that integers of relatively small magnitude (e.g., less than 512 for M and less than 64 for N) exist such that the resultant transport signal rate will be within several hundred or a few thousand parts per million (ppm) of the nominal OTN rate $R_{NOM}$ for most current protocols.

By way of example, FIG. 8 shows in tabular form the values of M and N for various client signal formats which result in a transport signal having a rate that is relatively close to $R_{NOM}$ for the G.975 format. In each case, the difference between the resulting transport signal rate and $R_{NOM}$ is sufficiently small so as to remain within tolerance limits (all shown with respect to $R_{NOM}$) considered to be acceptable by most current OTNs employing the G.975 transport signal format. It can be shown that for most client signal rates (denoted "$R_C$") arbitrarily located between the E3 and OC-48 rates (i.e., between 34.368 Mbps and 2.48832 Gbps), it is possible to find a 9-bit numerator M and a 6-bit denominator N such that the maximum error between $R_{NOM}$ and $((M/N) \times R_C)$ is within $R_{NOM}$+/−3922 ppm.

Figure 5:
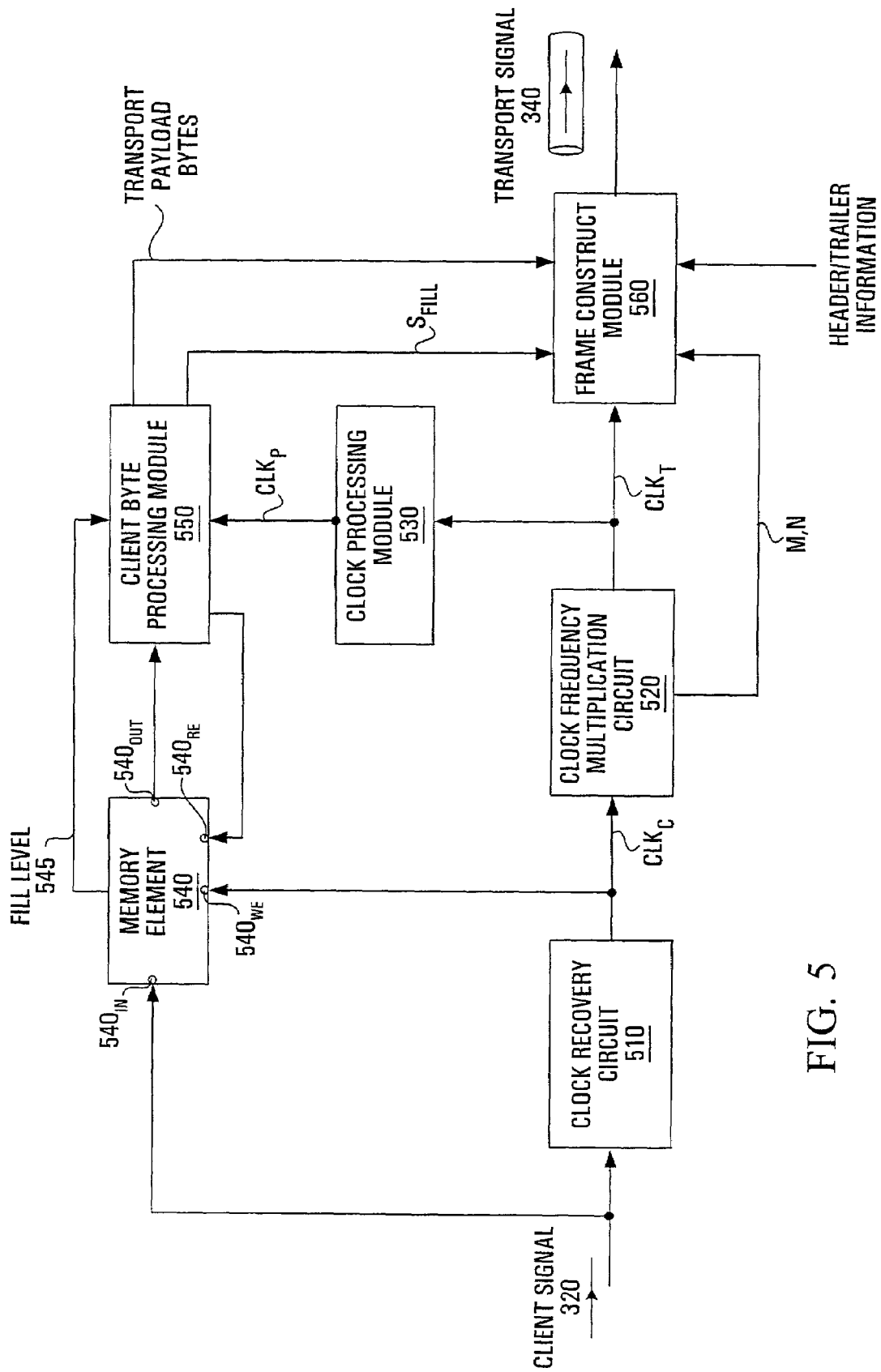
FIG. 5 is a block diagram illustrating a system located in an ingress interface, for providing client signal adaptation according to an embodiment of the present invention.

Continuing with the description of the system shown in FIG. 5, the transport clock signal $CLK_T$ running at the transport signal rate is fed from the clock frequency multiplication circuit 520 to the clock processing module 530 and to the frame construct module 560. The clock processing module 530 comprises circuitry for producing a transport payload byte clock signal $CLK_P$ that is fed to the client byte processing module 550. The transport payload byte clock signal $CLK_P$ is arranged to generate a cycle each time a transport payload byte is needed by the frame construct module 560 in constructing a transport frame. Thus, the transport payload byte clock signal $CLK_P$ is not entirely periodic because the payload section of each transport frame is concentrated near its mid portion.

The client byte processing module 550 is now described. This functional element is adapted to controllably read bytes of the client signal from the memory element 540 by supplying the latter with a read enable signal via its read enable port $540_{RE}$. The client byte processing module 550 also receives the transport payload byte clock signal $CLK_P$ from the clock processing module 530 and is adapted to respond to each cycle of the transport payload byte clock signal $CLK_P$ by releasing a transport payload byte for further processing by the frame construct module 560. Each transport payload byte released in this manner may be a client byte or a dummy byte, depending on the outcome of an insertion algorithm described further on with reference to FIG. 6.

In addition, the client byte processing module 550 is adapted to provide the frame construct module 560 with a binary fill indicator signal (denoted "$S_{FILL}$") which indicates to the frame construct module 560 whether the current transport frame is a low-fill frame or a high-fill frame. The fill indicator signal $S_{FILL}$ is particularly useful in applications where the number of client bytes received during the length of a transport frame is not an integer. The use of $S_{FILL}$ is optional in applications where the number of client bytes received during the length of a transport frame is consistently a whole number if that number can be pre-computed for that particular client signal rate.

The frame construct module 560 is now described. This functional element is seen to be connected to the client byte processing module 550, from which it receives transport payload bytes and the fill indicator signal $S_{FILL}$. The frame construct module 560 is also connected to the clock frequency multiplication circuit 520, from which it receives the transport clock signal $CLK_T$ and the parameters M and N. The frame construct module 560 further receives header and trailer information from an external source.

The frame construct module 560 comprises suitable circuitry, software, firmware and/or control logic for repeatedly aggregating the transport payload bytes received from the client byte processing module 550 into a payload section, appending appropriate header and trailer sections to the payload section in order to complete a transport frame and outputting the bytes in the transport frame at the transport signal rate. If the transport signal format is the G.975 format, then the bytes would be output from the transport frame on a column-by-column basis.

The frame construct module 560 is also adapted to encode, somewhere within the header or trailer section of the current transport frame, the value of $S_{FILL}$ associated with the current transport frame. This value is to be used by the egress interface when running an extraction algorithm which parallels the insertion algorithm being run by the client byte processing module 550 and described in further detail herein below. Since it is important to ensure the correct decoding of $S_{FILL}$ by the egress interface, redundancy may be used for added protection against corruption. For example, the value of $S_{FILL}$ could be encoded as 000010000 in order to indicate a low-fill frame and as 111101111 in order to indicate a high-fill frame.

It should also be noted that the parameters M and N associated with the client signal rate must be signaled to the egress interface at the other end of the OTN for proper re-construction of the client signal to take place. To this end, the values of M and N could appear somewhere in the header or trailer information associated with the first transport frame. Alternatively, the values of M and N could be fed to the egress interface along a separate control channel.

Figure 6:
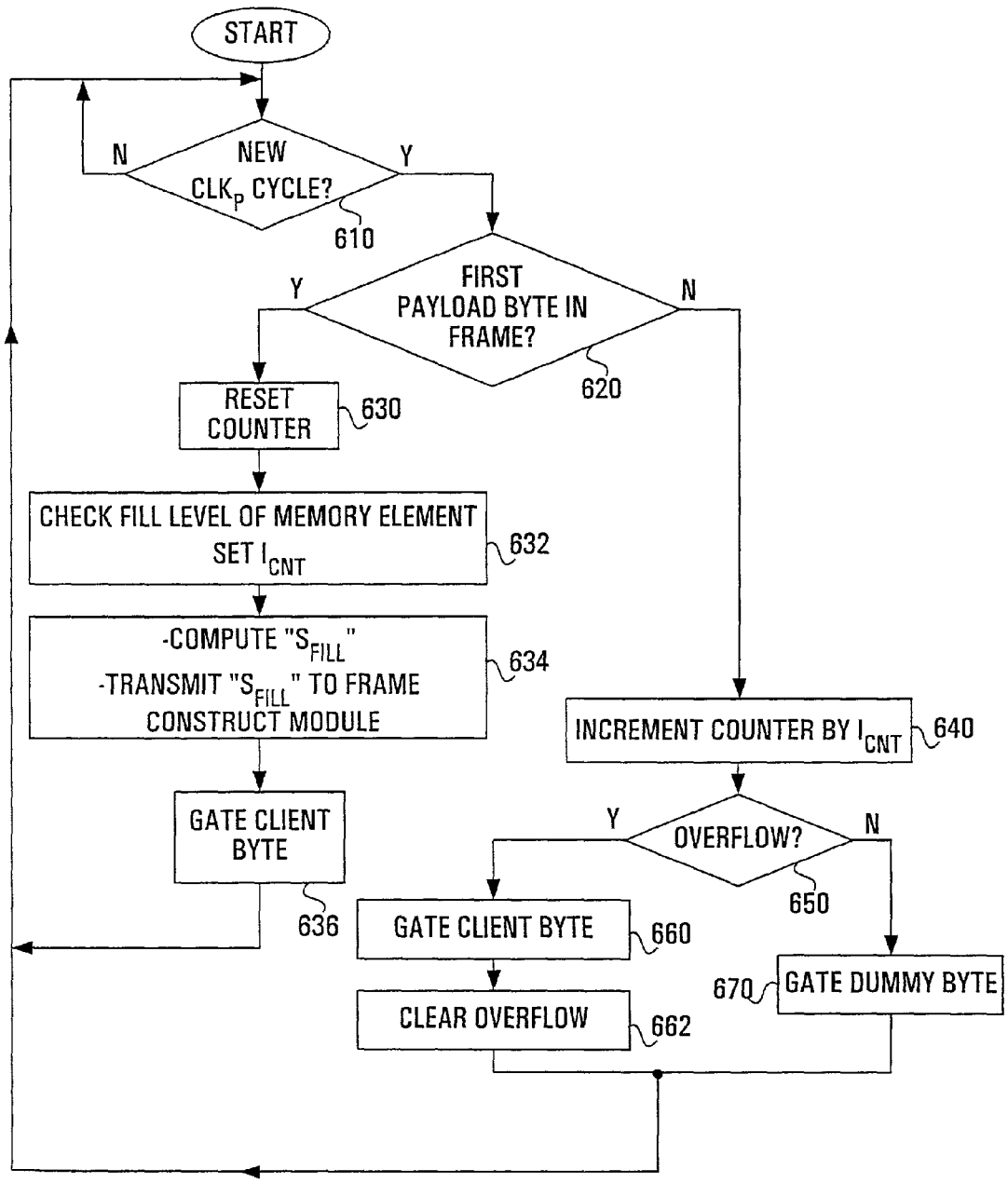
FIG. 6 is a flowchart illustrating the logical steps in an insertion algorithm run by a client byte processing module in the embodiment of FIG. 5.

Reference is now made to FIG. 6, which shows the logical steps in an insertion algorithm that can be used by the client byte processing module 550 to distribute the client bytes within the payload section of a transport frame. At STEP 610, the module senses a cycle of the transport payload byte clock signal $CLK_P$. At STEP 620, the module checks whether the next empty spot in the payload section is actually the first spot in the payload section. If so, the next steps are STEPS 630, 632, 634 and 636; otherwise, the next steps are STEPS 640 and 650.

STEPS 630, 632, 634 and 636:

At STEP 630, a software or hardware counter is reset. The counter has a modulus equal to the total number of bytes in the payload section of a transport frame. In the case of a G.975 transport frame, this number is equal to 3808. For ease of understanding, the counter can be viewed as functioning in a manner analogous to a gear in the sense that it provides rate translation between the rate of incoming client bytes and the rate of outgoing transport payload bytes.

At STEP 632, the fill level of the memory element 540 is checked. If it is below a pre-determined threshold level, then it can be concluded that the memory element 540 is emptying faster than it is filling and this is compensated for by making the current transport frame a low-fill frame. However, if the fill level of the memory element 540 is above the threshold level, then the memory element 540 is not emptying out at a sufficiently high rate and compensation is provided by making the current transport frame a high-fill frame. Accordingly, the value of the counter increment (denoted $I_{CNT}$) is set to either $F_L$ or $F_H$, where $F_L$ and $F_H$ are computed as already described.

At STEP 634, the binary value of $S_{FILL}$ is derived from the value of $I_{CNT}$ and this value of $S_{FILL}$ is fed to the frame construct module 560, which encodes it with the requisite level of redundancy and inserts the encoded version of $S_{FILL}$ into the header or trailer section of the current transport frame. Then at STEP 636, a client byte is gated through to the frame construct module 560 as the first byte in the payload section of the transport frame. The module then returns to STEP 610 and awaits the next cycle of the transport payload byte clock signal $CLK_P$.

STEPS 640 and 650:

At STEP 640, the counter is incremented by the value of the counter increment $I_{CNT}$ (which is set once per frame at STEP 632). Then, at STEP 650, the counter is checked for an overflow condition. If the counter has indeed overflowed, then, at STEP 660, the next client byte is gated through as the next byte in the payload section of the transport frame and the counter's overflow condition is cleared at STEP 662. On the other hand, if the counter has not overflowed, then a "dummy" byte is gated through as the next transport payload byte at STEP 670. In either case, the insertion algorithm returns to STEP 610 and awaits the next cycle of the transport payload byte clock signal $CLK_P$.

The above insertion algorithm provides an advantageous distribution of client bytes within the payload section of a transport frame. Specifically, by controlling the distribution of the client bytes among the transport payload bytes through monitoring an overflow condition of the counter, the resultant distribution is even and quasi-periodic, regardless of whether the number of client bytes received per transport frame is a whole number. This advantageously leads to a lower latency, less severe storage requirements, lower power consumption and smaller variations in the rate of the client signal as delivered to the egress interface.

Figure 9:
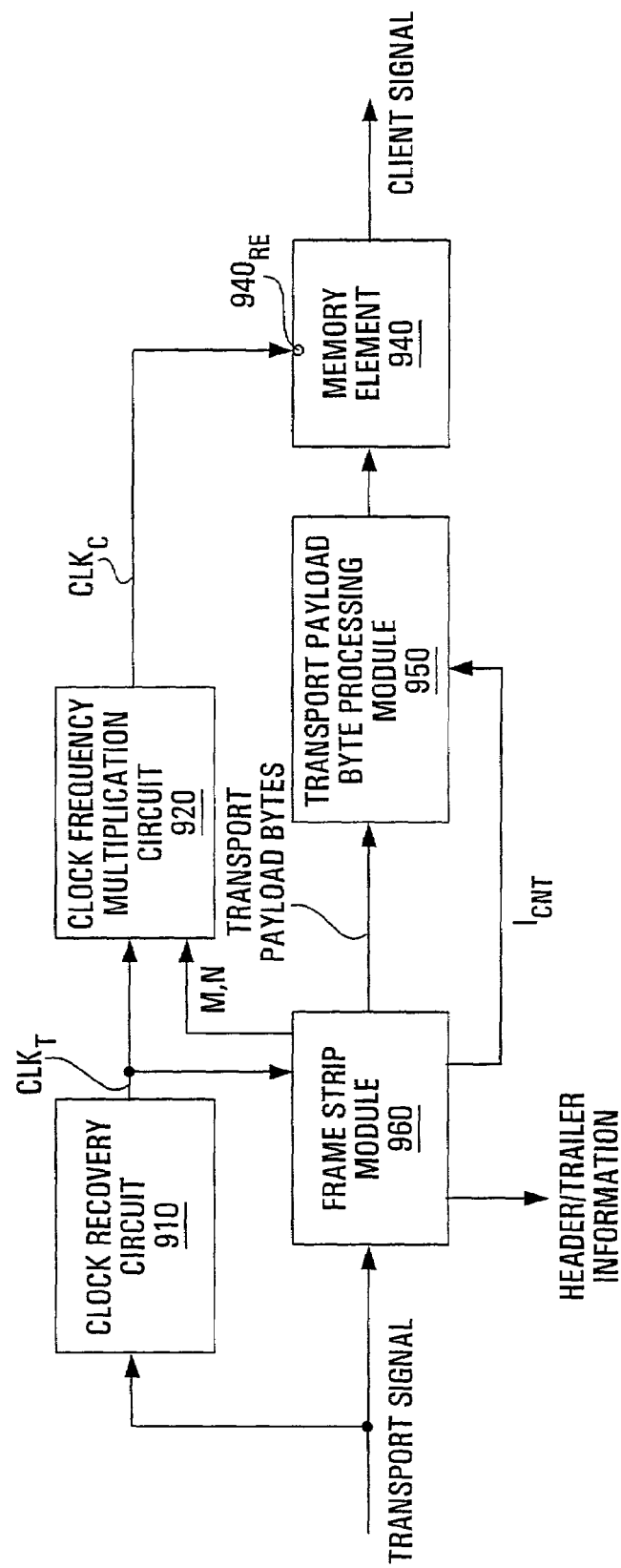
FIG. 9 is a block diagram illustrating a system located in an egress interface, for extracting a client signal from a transport signal according to an embodiment of the present invention.

Reference is now made to FIG. 9, which shows a processing system in the egress interface which is adapted to process a transport signal in order to extract client bytes therefrom. The transport signal is assumed to be of the type produced by the system of FIG. 5, i.e., the payload section of each transport frame has a distribution of client bytes which is controlled by the insertion algorithm of FIG. 6. The processing system of FIG. 9 includes a clock recovery circuit 910, a clock frequency multiplication circuit 920, a readable/writable memory element 940, a transport payload byte processing module 950 and a frame strip module 960.

The transport signal is fed to both the clock recovery circuit 910 and the frame strip module 960. The clock recovery circuit 910 is equipped with circuitry, such as a phase-locked loop, for recovering the transport clock signal $CLK_T$. The transport clock signal $CLK_T$ is fed to both the clock frequency multiplication circuit 920 and the frame strip module 960. The frame strip module 960 is adapted to read the received bytes in synchronism with the transport clock signal $CLK_T$ received from the clock recovery circuit 910. Specifically, the frame strip module 960 is adapted to extract information in the header, trailer and payload sections of each frame.

Some of the information in the header and/or trailer of each transport frame includes the value of $S_{FILL}$ for that transport frame as computed by the ingress interface. Thus, the frame strip module 960 comprises suitable circuitry, software and/or control logic for decoding the value of $S_{FILL}$ for the current frame, computing the value of $I_{CNT}$ as used by the ingress interface and continuously supplying this value of $I_{CNT}$ to the transport payload byte processing module 950. The value of $I_{CNT}$ will be either $F_L$ or $F_H$, depending on the value of $S_{FILL}$, where $F_L$ and $F_H$ are computed as in the ingress interface. Thus, it will always be possible to extract the correct number of client bytes per transport frame through access to the current value of $S_{FILL}$.

Other information, such as the values of M and N, may be present in the header and/or trailer of an initial transport frame. Thus, the frame strip module 960 may include suitable circuitry, software and/or control logic for extracting the values of M and N from a received transport frame and sending these values to the clock frequency multiplication circuit 920. Still other relevant portions of the information in the header and trailer sections of each received transport frame may be provided to an external system.

Finally, the frame strip module 960 comprises suitable circuitry, software and/or control logic for locating the bytes in the payload section of each received transport frame and forwarding these bytes to the transport payload byte processing module 950.

The transport payload byte processing module 950 receives transport payload bytes from the frame strip module 960 and also receives the current value of $I_{CNT}$ from the frame strip module 960. On the basis of an extraction algorithm which parallels the insertion algorithm being run at the client byte processing module 550, the transport payload byte processing module 950 decides whether each received transport payload byte is a client byte or a dummy byte. Thus, the transport payload byte processing module 950 decides whether to forward each received transport payload byte to the memory element 940 or to ignore it. A suitable extraction algorithm will be described in further detail later on with reference to FIG. 10.

Continuing with the description of FIG. 9, the clock frequency multiplication circuit 920 receives the transport clock signal $CLK_T$ from the clock recovery circuit 910 and receives the parameters M and N from the frame strip module 960. If the clock frequency multiplication circuit 520 in the ingress interface is an M/N-multiplying PLL, then the clock frequency multiplication circuit 920 should be an N/M-multiplying PLL.

Thus, the frequency of the clock signal at the output of the clock frequency multiplication circuit 920 will be N/M times the frequency of $CLK_T$, which is equal to precisely the client signal rate. The signal at the output of the clock frequency multiplication circuit 920 is thus appropriately called the client clock signal and is denoted $CLK_C$. The client clock signal $CLK_C$ is fed to a read enable port $940_{RE}$ of the memory element 940.

The memory element 940 therefore contains selected transport payload bytes, namely those which correspond to client bytes. The memory element 940 is read from at the client signal rate. Due to operation of the extraction algorithm as described herein below, the original client bytes exit the memory element 940 at the original client signal rate.

Figure 10:
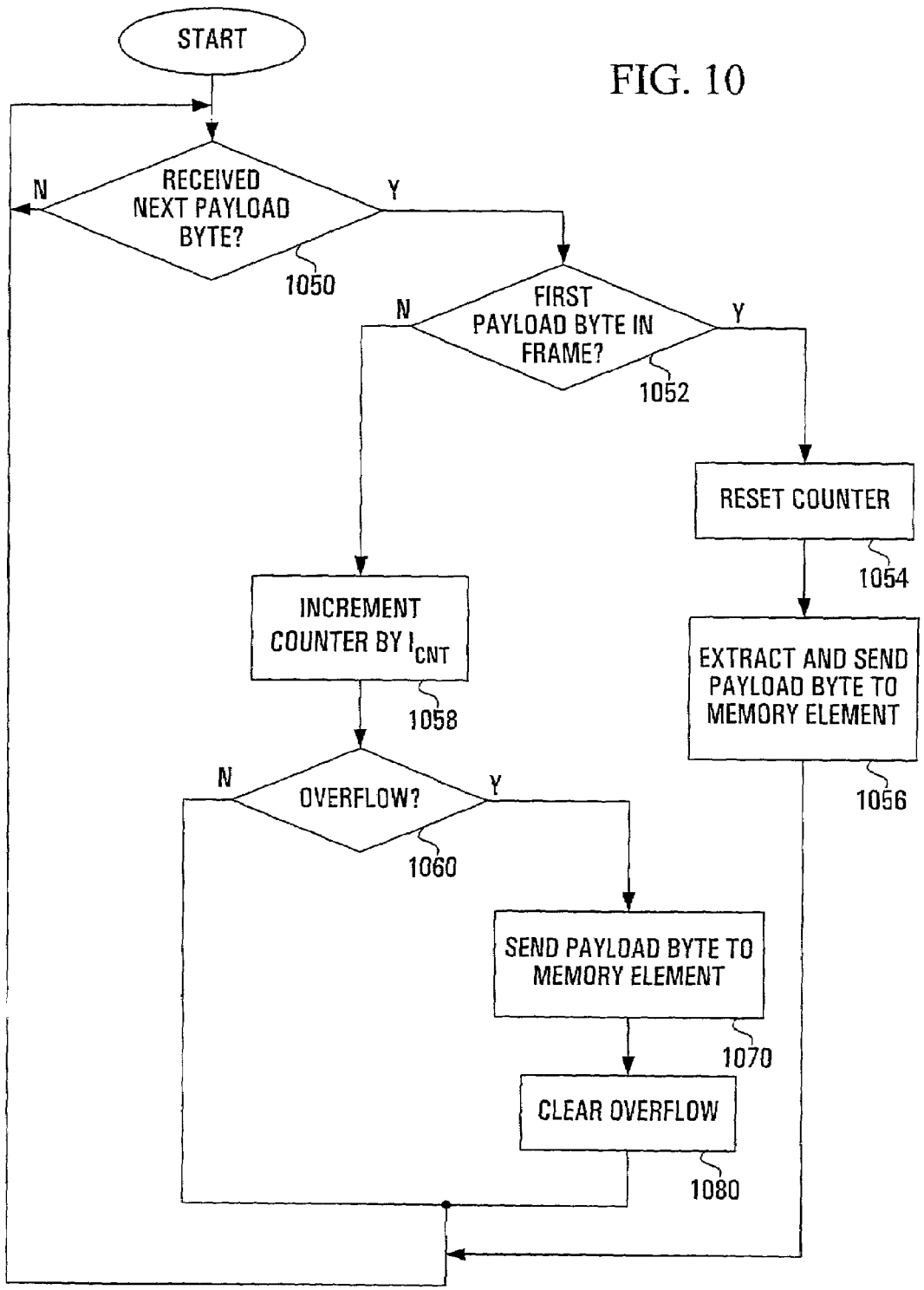
FIG. 10 is a flowchart illustrating an extraction algorithm run by a transport payload byte processing module in the embodiment of FIG. 9.

With reference now to FIG. 10, there is described an extraction algorithm which allows the transport payload byte processing module 950 to send to the memory element 940 only those transport payload bytes which actually contain client bytes. It should be appreciated that the extraction process should be matched to the insertion algorithm being run in the ingress interface. For ease of understanding, the extraction algorithm now described is compatible with the insertion algorithm of FIG. 6 which provided an even distribution of client bytes within the payload section of each transport frame.

At STEP 1050, the transport payload byte processing module 950 waits to receive the first (next) transport payload byte from the frame strip module 960 and, at STEP 1052, checks to see whether the received transport payload byte is the first byte in the payload section of a new transport frame. If so, the module proceeds to STEPS 1054 and 1056; otherwise, the module proceeds to STEPS 1058 and 1060.

STEPS 1054 and 1056:

At STEP 1054, a counter is reset. This counter should have the same parameters as the counter used in the client byte processing module 550 of FIG. 5. Specifically, it should have a modulus which corresponds to the number of bytes in a transport frame which, in the case of G.975, is equal to 3808. Since the first transport payload byte is actually a client byte (see STEP 636 of FIG. 6), STEP 1056 consists of sending this transport payload byte to the memory element 940. It is assumed that suitable write enable procedures are followed when the memory element 940 is accessed during this and all subsequent writing operations. The module now returns to STEP 1050, where the next received transport payload byte is awaited STEPS 1058 and 1060:

At STEP 1058, the counter is incremented by the current value of the counter increment $I_{CNT}$ being supplied by the frame strip module 960. It is recalled that the value of $I_{CNT}$ may change at the beginning of a frame but remains constant throughout the duration of the frame. It is thus seen that the counter in the egress interface will follow an identical sequence of state transitions as the counter in the ingress interface.

At STEP 1060, the extraction algorithm consists of checking the overflow status of the counter. If the counter has not yet overflowed, then the received transport payload byte is a dummy byte, which can be ignored. Otherwise, if the counter has overflowed, then the received transport payload byte is a client byte. Thus, the module proceeds to STEP 1070, where the received transport payload byte is sent to the memory element, and to STEP 1080, where the overflow condition is cleared. Regardless of whether the received transport payload byte is a client byte or a dummy byte, the module now returns to STEP 1050, where the next received transport payload byte is awaited.

It can be seen from the above that only client bytes are forwarded to the memory element 940, with all dummy bytes being ignored by the transport payload byte processing module. Furthermore, the memory element 940 is read from at the client signal rate, the end result being that the signal at the output of the memory element 940 is in fact the original client signal, which can then be fed to the appropriate recipient such as a customer site. Advantageously, if the distribution of client bytes within the payload section of received frames was even to begin with, the client bytes output to the memory element 940 will also be even.

Many variations of the above embodiments are possible. For instance, while in FIG. 9 it is the frame strip module 960 which is responsible for computing and updating the value of the counter increment $I_{CNT}$, it may be advantageous in some circumstances to integrate this task within the transport payload byte processing module 950.

Also, it should be understood that the invention is applicable to providing compatibility with any frame-based transport signal format, including G.975, G.709 and others. Moreover, the above references to bytes are for example purposes only and are not meant to exclude the use of other data units or multiple valued logic from the ambit of the present invention as contemplated herein.

Those skilled in the art should further appreciate that in some embodiments of the invention, all or part of the functionality previously described herein with respect to the system may be implemented as pre-programmed hardware elements (e.g., application specific integrated circuits), or other related components. In other embodiments of the invention, all or part of the functionality previously described herein with respect to the system may be implemented as software consisting of a series of instructions for execution by a computer system.

The series of instructions could be stored on a medium which is fixed, tangible and readable directly by the computer system, (e.g., removable diskette, CD-ROM, ROM, or fixed disk), or the instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the series of instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

We claim:

1. A method of converting a received client signal containing client data units into a frame-based transport signal at a higher bit rate, comprising the steps of:
creating successive payload sections each accommodating the same number of transport data units, each transport data unit being a byte, each transport data unit also being set either to one of the received client data units or to a dummy data unit; and
creating successive frames of the transport signal by appending ancillary data to each payload section;
wherein the number of client data units carried by the payload section of each frame is within one client data unit of the actual number of client data units received during the duration of that frame.

2. A method as claimed in claim 1,
wherein the number of client data units received during the duration of a frame is a whole number; and
wherein the number of client data units carried by the payload section of each frame is exactly equal to said whole number.

3. A method as claimed in claim 2, wherein said whole number is less than the number of transport data units accommodated by the payload section of a frame.

4. A method as claimed in claim 1,
wherein the number of client data units received during the duration of a frame is a fractional number falling between two adjacent integers $F_L$ and $F_H$; and
wherein the number of client data units carried by the payload section of each frame is equal to either $F_L$ or $F_H$; and
wherein the ancillary data associated with the frame contains information related to the chosen number of client data units carried by the payload section in that frame.

5. A method as claimed in claim 4, wherein the integers $F_L$ and $F_H$ are functions of both the data unit rate of the client signal and the frame rate of the transport signal.

6. A method as claimed in claim 4, wherein the integer $F_L$ is equal to the greatest integer which is less than or equal to the number of client data units received per second multiplied by the duration of a frame.

7. A method as claimed in claim 4, wherein the information related to the number of client data units carried by the payload section of a frame is redundantly encoded in the ancillary data associated with that frame.

8. A method as claimed in claim 4, further comprising the step of temporarily storing the received client data units in a buffer having a measurable fill level, wherein the number of client data units carried by the payload section of each frame is a function of the fill level of the buffer.

9. A method as claimed in claim 1, wherein client data units are substantially evenly distributed within the payload section of each frame of the transport signal.

10. A method as claimed in claim 1, wherein the first transport data unit in the payload section of each frame is set to a first client data unit and wherein the method further comprises the step of:
incrementing a counter each time a transport data unit is set either to one of the client data units or to the dummy data unit, by an amount equal to the number of client data units carried by the payload section of the current frame, wherein the counter has a modulus equal to the total number of transport data units accommodated by the payload section of each frame;
wherein each transport data unit other than the first one in the payload section of the current frame is set either to the client data unit or to the dummy data unit as a function of the overflow status of the counter after performing the incrementing step for that transport data unit.

11. A method as claimed in claim 1, further comprising the steps of:
extracting a client clock signal from the client signal;
processing the client clock signal to produce a transport clock signal at a frequency of M/N times the frequency of the client clock signal, where M and N are integers; and
outputting the transport signal in synchronism with the transport clock signal.

12. A method as claimed in claim 11, wherein the values of M and N are transmitted as part of the ancillary data associated with at least one frame.

13. A method as claimed in claim 1, wherein the transport signal is compliant with the G.975 standard.

14. An article of manufacture, comprising:
a computer usable medium having computer readable program code means embodied therein for causing the conversion of a received client signal containing client data units into a frame-based transport signal at a higher bit rate, the computer readable program code means in said article of manufacture comprising:
computer readable program code for causing a computer to create successive payload sections each accommodating the same number of transport data units, each transport data unit being a byte and each transport data unit being set either to one of the received client data units or to a dummy data unit; and
computer readable program code for causing a computer to create successive frames of the transport signal by appending ancillary data to each payload section;
wherein the number of client data units carried by the payload section of each frame is within one client data unit of the actual number of client data units received during the duration of that frame.

15. A system for converting a received client signal containing client data units into a frame-based transport signal, comprising:
a first processing module adapted to output transport data units, each of which is set either to one of the received client data units or to a dummy data unit, wherein each transport data unit is a byte, the first processing module being further adapted to ensure that the number of client data units output during each frame is within one client data unit of the number of client data units received during the duration of that frame; and
a second processing module connected to the first processing module and adapted to create successive payload sections each accommodating the same number of transport data units received from the first processing module, the second processing module being further adapted to create successive frames of the transport signal by appending an ancillary data section to each payload section and outputting the data units in the ancillary section and the payload section faster than the rate at which the client signal is received.

16. A system as claimed in claim 15, further comprising:
a clock recovery circuit, for recovering a clock which is synchronous with the received client signal;
a clock processing module connected to the clock recovery circuit and to the first processing module, for generating a gating signal which indicates to the first processing module when to output a transport data unit; and a clock frequency multiplication circuit connected to the clock recovery module and to the second processing module, for generating the faster clock signal used by the second processing module in outputting the transport signal.

17. A system as claimed in claim 16, wherein the clock recovery circuit comprises an M/N-multiplying phase-locked loop, wherein M and N are integers.

18. A system as claimed in claim 17, wherein the values of M and N are supplied by the first processing module via a control line.

19. A system as claimed in claim 16, further comprising:
a memory element connected to the first processing module and to the clock recovery circuit, for storing client data units under control of the clock recovery circuit and for outputting client data units to the first processing module under control of the first processing module.

20. A system as claimed in claim 19, wherein the memory element is adapted to produce a control signal indicative of whether its capacity has reached a pre-determined fill level.

21. A system as claimed in claim 20, wherein the memory element supplies said control signal to the first processing module, wherein the first processing module is adapted to decide how many client data units to output during each frame as a function of the value of said control signal.

22. A system as claimed in claim 15, wherein the first processing module is adapted to output client data units at substantially periodic intervals.

23. A system as claimed in claim 22, wherein the first processing module is adapted to ensure that the first transport data unit in the payload section of each frame is set to a client data unit and wherein the first processing module is further adapted to:
increment a counter each time a transport data unit is set either to one of the client data units or to the dummy data unit, by an amount equal to the number of client data units carried by the payload section of the current frame, wherein the counter has a modulus equal to the total number of transport data units accommodated by the payload section of each frame;
wherein each transport data unit other than the first one in the payload section of the current frame is set either to one of the client data units or to the dummy data unit as a function of the overflow status of the counter after performing the incrementing step for that transport data unit.

24. A method of converting a received transport signal into a client signal, said transport signal comprising a series of frames each containing a payload section and an ancillary data section appended to the payload section, wherein each payload section comprises a plurality of transport data units each of which is either a client data unit or a dummy data unit, the method comprising the steps of:
determining whether each transport data unit in each frame of the transport signal is one of the client data units or a dummy data unit, wherein each dummy data unit is a byte; and
outputting to a buffer only those transport data units determined to be client data units.

25. A method as claimed in claim 24, further comprising the step of:
creating the client signal by reading from the buffer at a rate lower than that of the transport signal.

26. A method as claimed in claim 25, the method further comprising the steps of:
treating the first transport data unit in the payload section of each frame as one of the client data units; and
incrementing a counter each time a transport data unit is processed, by an amount equal to the number of client data units carried by the payload section of the current frame, wherein the counter has a modulus equal to the total number of transport data units accommodated by the payload section of each frame;
wherein each transport data unit other than the first one in the payload section of the current frame is determined to be either one of the client data units or the dummy data unit as a function of the overflow status of the counter after performing the incrementing step for that transport data unit.

27. A method as claimed in claim 26, wherein the number of client data units carried by the payload section of the current transport frame is determined by reading information contained in the ancillary data section associated with that frame.

28. A method as claimed in claim 24, further comprising the steps of:
determining the values of the numerator and denominator of a clock frequency multiplier ratio;
extracting a transport clock signal from the transport signal;
processing the transport clock signal to produce a client clock signal at a frequency equal to the frequency of the transport clock signal times the clock frequency multiplier ratio; and
outputting the client signal in synchronism with the client clock signal.

29. A method as claimed in claim 28, wherein the values of the numerator and denominator are determined from the ancillary data section associated with at least one frame.

30. An article of manufacture, comprising:
a computer usable medium having computer readable program code means embodied therein for causing the conversion of a received transport signal into a client signal, said transport signal comprising a series of frames each containing a payload section and an ancillary data section appended to the payload section, wherein each payload section comprises a plurality of transport data units each of which is either a client data unit or a dummy data unit, the computer readable program code means in said article of manufacture comprising:
computer readable program code for causing a computer to determine whether each transport data unit in each frame of the transport signal is one of the client data units or the dummy data unit, wherein each transport data unit is a byte; and
computer readable program code for causing a computer to output to a buffer only those transport data units determined to be client data units.

31. A system for converting a transport signal into a client signal, said transport signal comprising a series of frames each containing a payload section and an ancillary data section, wherein the payload section carries transport data units each of which can be a client data unit or a dummy data unit, the system comprising:
a first processing module adapted to locate the payload section of each received frame and to output the transport data units in the payload section of each frame; and a second processing module connected to the first processing module, the second processing module being adapted to:
   determine whether each transport data unit in each frame of the transport signal is one of the client data units or the dummy data unit, wherein each transport data unit is a byte; and
   output to a buffer only those transport data units found to be client data units.

32. A system as claimed in claim 31, further comprising:
   the buffer connected to the second processing module, for temporarily storing the client data units output by the second processing module and for outputting its contents at a controllable rate;
   a clock recovery circuit, for recovering a clock which is synchronous with the transport signal; and
   a clock frequency multiplication circuit connected to the clock recovery circuit and to the buffer, the clock frequency multiplication circuit being adapted to produce a client clock signal at a rate which is less than that of the transport signal and to provide the client clock signal to the buffer so as to control the output rate thereof.

33. A system as claimed in claim 32, wherein the ancillary data section associated with at least one frame contains a numerator and a denominator and wherein the first processing module is adapted to read the numerator and the denominator and to provide these to the clock frequency multiplication circuit.

34. A system as claimed in claim 33, wherein the clock frequency multiplication circuit is a numerator/denominator-multiplying phase-locked loop.

35. A system as claimed in claim 31, wherein the second processing module is adapted to output client data units at substantially periodic intervals.

36. A system as claimed in claim 35, wherein the second processing module is adapted to ensure that the first transport data unit in the payload section of each frame is considered to be a client data unit and wherein the first processing module is further adapted to:
   increment a counter each time a transport data unit is processed, by an amount equal to the number of client data units carried by the payload section of the current frame, wherein the counter has a modulus equal to the total number of transport data units accommodated by the payload section of each frame;
   wherein each transport data unit other than the first one in the payload section of the current frame is considered to be either one of the client data units or the dummy data unit as a function of the overflow status of the counter after performing the incrementing step for that transport data unit.

37. A system as claimed in claim 36, wherein the first processing module is further adapted to determine how many client data units are carried by the payload section of the current frame by reading information in the ancillary data section associated with that frame.

38. A method for converting a client signal containing client data units into a frame-based transport signal compatible with a transport network and for retrieving the client signal at another part of the network, comprising the steps of:
   (A) at an ingress interface:
      creating successive payload sections each accommodating the same number of transport data units, each transport data unit being set either to a received client data unit or to a dummy data unit, wherein each transport data unit is a byte;
      creating successive frames of the transport signal by appending ancillary data to each payload section, wherein the number of client data units carried by the payload section of each frame is within one client data unit of the actual number of client data units received during the duration of that frame; and
      sending the frames into the transport network towards an egress interface at a data unit rate higher than that of the client signal; and
   (B) at the egress interface:
      determining whether each transport data unit in each frame is one of the client data units or the dummy data unit;
      outputting to a buffer only those transport data units determined to be client data units; and
      reading from the buffer at the lower data unit rate, thereby to recover the original client signal.

* * * * *